May 13, 1930.  F. W. MOFFAT  1,758,579

COOKING TOP OF ELECTRIC RANGES

Filed March 11, 1929

Inventor
F. W. Moffat
By J. Edw. Maybee
ATTY.

Patented May 13, 1930

1,758,579

UNITED STATES PATENT OFFICE

FREDERICK W. MOFFAT, OF WESTON, ONTARIO, CANADA

COOKING TOP OF ELECTRIC RANGES

Application filed March 11, 1929. Serial No. 346,134.

This invention relates to the cooking tops of electric ranges in which electric heating elements are positioned in openings formed in a flat plate forming the upper surface of the top. It is preferable to secure the elements in position, and one feature of my invention is the provision of means for holding the elements against displacement without the use of clips, bolts or other means showing at the upper surface of the top. To each element two or more lead wires are connected and these necessarily have to cross the small gap between the exterior periphery of the heating element and the edge of the hole in the top in which it is fitted, and a second feature of my invention is to protect these wires from any liquid which may spill over from cooking utensils in use on the top. A further feature is the provision of means for effectively grounding the element to the cooking top and thus to the body of the range.

I attain the desired results by means of constructions which may be briefly described as follows. It is usual to provide the cooking top with depending hangers on which the heating elements rest when positioned in the openings in the top. To releasably lock the elements in place, I provide each with one or more keepers adapted to be engaged beneath the hangers, by a partial movement of rotation of an element, to resist upward displacement of the element in shipping. To protect the lead wires of an element from drip and to hold them in place so that they cannot sag and make a short on the body of the range, I provide a drip guard, preferably formed integral with one of the hangers, which will catch any drip passing through the space aforesaid above the lead wires and discharge it direct to the pan usually fitted beneath the cooking top. This drip guard forms a convenient point of attachment of one end of a grounding wire, the other end of which is bolted to the metal pan of the adjacent element.

Figure 1:
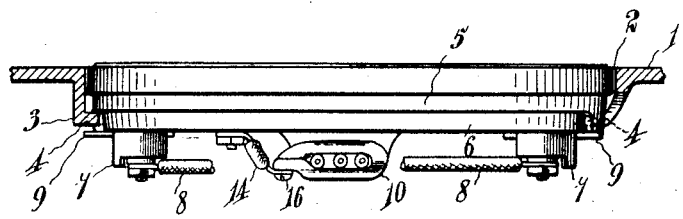
Figure 2:
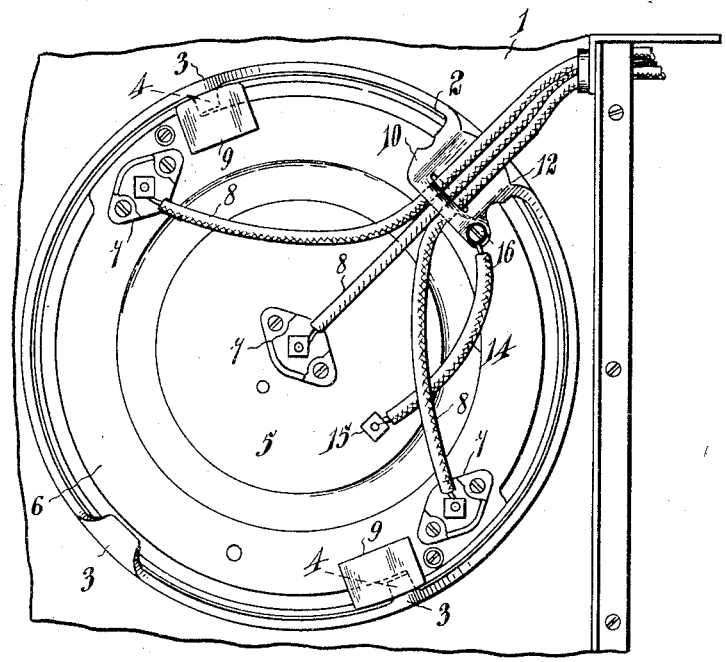
Figure 3:
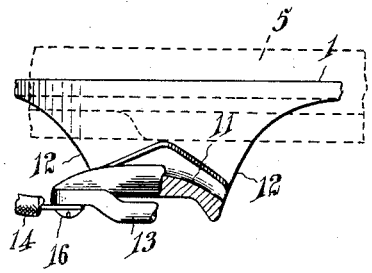

The invention is hereinafter more fully described and is illustrated in the accompanying drawings in which Fig. 1 is a cross section of part of a cooking top with a heating element supported therein, the element being shown in side elevation and its central terminal omitted;

Fig. 2 a plan view of the underside of the same;

Fig. 3 a front elevation of the drip guard; and

Figure 4:
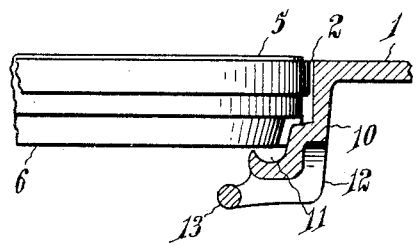

Fig. 4 a cross section of the same showing part of the element.

In the drawings like numerals of reference indicate corresponding parts in the different figures.

1 is a plate which forms part of the cooking top of an electric range. In this plate is formed an opening 2 for the reception of a heating element. In practice, of course, each cooking top will usually be provided with a plurality of such openings.

Extending down from the under surface of the plate 1 adjacent the opening 2 are a plurality of hangers 3, preferably integral with the plate, each hanger having an inwardly extending projection 4 on which the heating element rests. The exact construction of the heating element is immaterial as far as the present invention is concerned. I show, however, what is commonly known as a closed element 5, the under side of which is formed by a metal pan 6.

Each element is provided with a plurality of terminals 7 extending from its under side to which are connected the lead wires 8, which in practice are connected with a suitable switch, not shown. Ordinarily the element is held in place by clips secured to the upper surface of the plate 1 and extending over the upper surface of the element. In the present invention I provide the element with a plurality of keepers 9 secured to the under side of the pan 6. The pan is rabetted as shown at 15 to form a shoulder resting on the projections 4 while the keepers 9 are sufficiently spaced from said shoulder to engage the under side of the projections 4. The element is therefore easily connected or disconnected by a movement of rotation to bring the keepers under the projections or to disengage them therefrom.

It will be noted that the lead wires 8 have to cross the gap between the rim of the opening 2 and the rim of the element 5 and, however, small this gap may be, there is always the possibility of liquid spilt on the cooking top passing down through this gap on to the lead wires, thus causing trouble due to destruction of the insulation, with the accompanying possibility of short circuits. To overcome this trouble I provide a drip guard 10, which is preferably formed integral with one of the hangers 3. This drip guard extends underneath the bottom of the pan 6 and is formed with a transverse groove 11, which groove and its rear wall are curved in the direction of their length to discharge downwardly away from the lead wires which are positioned under the drip guard. The underside of the drip guard is provided with depending flanges 12 which form a channel in which the lead wires are received and which serve to prevent drip creeping along the under side of the guard towards the lead wires. To hold the lead wires properly positioned under the drip guard I provide the transverse support 13, which is preferably formed integral with the ends of the side flanges 12. The lead wires pass over this transverse support and are held by it close up against the under side of the drip guard between the side flanges. The lead wires are thus not only thoroughly protected from drip, but are held up from sagging into contact with parts of the range underneath or with the metal tray, which is usually fitted beneath the cooking top, which would otherwise be a possibility, as sufficient slack must be provided to permit of the rotation of the element to engage and disengage the keepers 9 as hereinbefore referred to. The drip guard also forms a convenient means for grounding the metal pan 6 of the element to the cooking top. For this purpose I use the grounding wire 14, which is secured by the bolt 15 to the metal pan and by the bolt 16 to the drip guard. Good connections are thus obtained which was not always the case when contact between the element and the hangers 3 was depended upon for a ground connection. The drip guard, it will be noted, also serves an important purpose when it is desired to remove an element. By rotating the element the keepers 9 are disengaged from the projections 4 and, as the rabbets extend only part way round the element, it is possible by continuing the rotation of the element to cause the pan at one end of the adjacent rabbet to ride up the inclined wall of the groove 11 and thus make its edge accessible for engagement for lifting.

What I claim as my invention is:

1. An electric range provided with a cooking top having an opening therein, a heating element supported in said opening and flexible lead wires beneath the top leading to said element and crossing the gap between the rim of the heating element and the edge of the opening in the top in which there is provided a drip guard connected to the underside of said top extending across the said gap and over the lead wires.

2. An electric range according to claim 1 in which the heating element is supported on hangers connected with the under side of the top and the drip guard is integral with one of said hangers.

3. A specific construction of the drip guard according to claim 1 in which it is formed with a transversely arranged channel curved in the direction of its length to discharge downwardly away from the lead wires.

4. A specific construction of the drip guard according to claim 1 in which it is provided with a transverse support for the lead wires adapted to hold them close underneath the guard.

5. A specific construction of the drip guard according to claim 1 in which the under side of the guard is provided with side flanges adapted to prevent drip creeping along the under side of the guard towards the lead wires.

6. An electric range according to claim 1 in which a grounding wire is clamped to the element and to the drip guard.

7. An electric range according to claim 1 in which the heating element is supported on hangers connected with the under side of the top and the pan of the heating element is provided with keepers adapted to be engaged beneath the hangers by a partial movement of rotation of the element.

8. An electric range provided with a cooking top having an opening therein, a heating element supported in said opening and lead wires beneath the top leading to said element in which there is provided a plurality of hangers connected to the under side of the top and on which the heating element is supported, the pan of the element being provided with keepers adapted to be engaged beneath the hangers by a partial movement of rotation of the element.

9. An electric range according to claim 1 in which the heating element is supported on hangers connected with the underside of the top and the drip guard is integral with one of said supports, the said guard being formed with a transversely arranged channel curved in the direction of its length to discharge downwardly away from the lead wires.

10. An electric range according to claim 1 in which the heating element is supported on hangers connected with the under side of the top and the drip guard is integral with one of said supports, the said guard being formed with a transversely arranged channel curved in the direction of its length to discharge downwardly away from the lead wires and with side flanges at the underside of the drip guard adapted to prevent drip creeping along the under side of the guard towards the lead wires.

Signed at Toronto, Canada, this 22nd day of February, 1929.

FREDERICK W. MOFFAT.